United States Patent
Sharir et al.

(10) Patent No.: US 8,443,438 B1
(45) Date of Patent: May 14, 2013

(54) METHOD AND SYSTEM FOR DEPLOYMENT OF AGENTS

(75) Inventors: Azriel Razi Sharir, Ein Vered (IL); Noam Birnbaum, Shoham (IL)

(73) Assignee: BMC Software, Inc., Houston, TX (US)

( * ) Notice: Subject to any disclaimer, the term of this patent is extended or adjusted under 35 U.S.C. 154(b) by 1362 days.

(21) Appl. No.: 11/516,531

(22) Filed: Sep. 6, 2006

(51) Int. Cl.
*G06F 21/00* (2006.01)

(52) U.S. Cl.
USPC ............... 726/22; 726/17; 726/25; 380/258; 713/167; 713/168; 709/223; 709/224; 455/410; 705/7.15; 705/14.26

(58) Field of Classification Search ............ 726/25, 726/22; 709/224
See application file for complete search history.

(56) References Cited

U.S. PATENT DOCUMENTS

| | | | |
|---|---|---|---|
| 7,373,399 B2 * | 5/2008 | Steele et al. | 709/223 |
| 7,424,742 B1 * | 9/2008 | Dash et al. | 726/22 |
| 7,454,487 B1 * | 11/2008 | Becher et al. | 709/223 |
| 7,516,206 B2 * | 4/2009 | Henseler et al. | 709/223 |
| 7,571,154 B2 * | 8/2009 | Emeis et al. | 1/1 |
| 2002/0062334 A1 * | 5/2002 | Chen et al. | 709/200 |
| 2003/0084096 A1 * | 5/2003 | Starbuck et al. | 709/203 |
| 2004/0098419 A1 * | 5/2004 | Bantz et al. | 707/203 |
| 2004/0122937 A1 * | 6/2004 | Huang et al. | 709/224 |
| 2004/0249935 A1 * | 12/2004 | Jackson et al. | 709/224 |
| 2005/0022176 A1 * | 1/2005 | Ramachandran et al. | 717/170 |
| 2005/0027846 A1 * | 2/2005 | Wolfe et al. | 709/223 |
| 2006/0015606 A1 * | 1/2006 | Gebhardt et al. | 709/223 |
| 2006/0077189 A1 * | 4/2006 | Merrison | 345/179 |
| 2006/0136701 A1 * | 6/2006 | Dickinson | 712/205 |
| 2006/0149729 A1 * | 7/2006 | Pfeiffer et al. | 707/6 |
| 2007/0156889 A1 * | 7/2007 | Bhrara et al. | 709/224 |
| 2007/0208837 A1 * | 9/2007 | Tian et al. | 709/223 |
| 2007/0299962 A1 * | 12/2007 | Budzisch et al. | 709/224 |
| 2008/0134165 A1 * | 6/2008 | Anderson et al. | 717/173 |

OTHER PUBLICATIONS

Lee et al. "A new home network protocol for controlling and monitoring home appliances—HNCP", Consumer Electronics, 2002. ICCE. 2002 Digest of Technical Papers. International Conference on, Date of Conference: 2002, pp. 312-313.*

* cited by examiner

*Primary Examiner* — Morshed Mehedi (57) ABSTRACT

Systems and methods for deploying agents for a management system across IT infrastructure in an automated fashion are disclosed herein. Embodiments of the present invention allow agents to be substantially automatically deployed or configured in conjunction with previously unknown or newly added application components. More specifically, embodiments of the present invention may track traffic associated with application components to identify unknown application components. Agents may then be deployed to monitor these newly identified application components.

16 Claims, 6 Drawing Sheets

METHOD AND SYSTEM FOR DEPLOYMENT OF AGENTS

TECHNICAL FIELD OF THE INVENTION

This invention relates generally to the distribution and installation of computer programs. More particularly, specific embodiments of the present invention relate to deploying agents to monitor application components in conjunction with a management system.

BACKGROUND OF THE INVENTION

As web sites become more important to commerce, education, governmental functions and other aspects of society, entities controlling web sites are increasingly interested in setting performance goals and quality standards for their web sites. Particularly, entities are interested in how quickly their web servers (and related other servers such as application and database servers) respond to defined actions by an end-user.

A business for example, may be interested in how quickly its web server responds in aggregate to user requests to add items to a virtual shopping cart. A particular user action on a web page, such as clicking on an "Add to Cart" button, however, may generate multiple HTTP requests, some of which may contain many parameters. The user-action action of selecting the Add to Cart button may cause, for example, the web browser to generate requests with parameters related to the particular user and item, requests for static and dynamic content and other requests. Moreover, the user action can cause different requests to be generated depending on the context of the action. For example, the same action taken by a different user can cause different HTTP requests to be generated.

The information technology (IT) infrastructure which processes these transactions may be a complex infrastructure of intertwined computers, applications, operating systems, etc. Thus, the completion of a transaction may entail a variety of communications between the different servers or applications that make up the IT infrastructure. Consequently, it may be difficult to track the various actions within an IT infrastructure that are associated with a particular transaction.

Typically, to solve these problems a management system is utilized. Management systems may, in turn, utilize agents to fulfill application monitoring and control tasks. In other words, these agents are deployed in conjunction with the servers or applications themselves in order to monitor the servers or applications in the IT infrastructure. This solution is not without its problems, however. The task of identifying application components and servers associated with an application, and thus are candidates for deployment, is tedious and usually this knowledge is not easily available.

Furthermore, the deployment of agents in conjunction with various applications usually requires a large degree of maintenance, as an IT infrastructure may experience frequent changes such as moving an application component from one device to another, the addition of various devices or applications, etc. This installation of agents is therefore manual by nature and is crucial to the correct behavior of a management system, otherwise the management system will not accurately track transactions. Accordingly, the installation and upkeep of agents associated with a management system may be manually intensive task which consumes a relatively large percentage of an IT manager's time or resources in order to track application changes and manually reflect them in the configuration of the application management system and its associated agents. Because management systems may consume a disproportionate amount of an IT managers time, these management systems may become a less attractive solution for many application management projects.

Thus, a need exists for deploying agents for the monitoring of applications or devices in a more automated manner.

SUMMARY OF THE INVENTION

Systems and methods for deploying agents for a management system across IT infrastructure in an automated fashion are presented herein. Embodiments of the present invention allow agents to be substantially automatically deployed or configured in conjunction with previously unknown or newly added application components. More specifically, embodiments of the present invention may track traffic associated with application components to identify unknown application components. Agents may then be deployed to monitor these newly identified application components.

In one embodiment, agents may be deployed on known application components in an IT infrastructure. These agents may each monitor communications corresponding to its respective application component to assemble a list of unknown application components. These lists of unknown application components may be gathered at a central location such as a management application from which agents may be deployed to monitor the unknown application components.

In some embodiments, unknown application components may be determined by analyzing communications to a monitored application component, while in other embodiments unknown application components may be discovered by determining if a destination for a communication from a monitored application component is unknown.

Determining if a destination for a communication may be determined, in one embodiment, by comparing this destination to a list of known application components.

Embodiments of the present invention may provide the technical advantage that any changes to an IT infrastructure or application components may be accounted for by deploying agents associated with a management system substantially automatically without changes to either the application or the rest of the management system itself, reducing the amount of manual effort involved in implementing and utilizing a management system.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification. A "transaction", for purposes of this disclosure, is a request and the set of communications and processing used to receive, process or generate a response to that request. Similarly, an application will be understood to a set of application components involved in implementing or supporting the application. While examples of transactions that have been initiated by a user at a browser application may be utilized to explain embodiments of the present invention herein, it should be understood that the term transaction applies equally well to a request generated from almost any other source, including computers using web services, running applications, etc.

Before turning to embodiments of the present invention, a general description of an example IT infrastructure which may be utilized in explaining these various embodiments will be described. A block diagram of one embodiment of just such an example IT infrastructure is described in FIG. 1. Client computer 105 can connect to an IT infrastructure 110 via a network 115 (e.g., a LAN, WAN, wireless network, global communications network, or other network known in the art). Client computer 105 can include a web browser program 120 which generates requests to IT infrastructure 110 for content corresponding to a particular uniform resource identifier ("URI"), which may be or include a uniform resource locator ("URL"), and displays the returned content (or a portion of the returned content) in a graphical user interface ("GUI"). A user can use the GUI to take further actions to generate additional requests to IT infrastructure 110. IT infrastructure 110 returns content in response to the requests made by web browser program 120.

Figure 1:
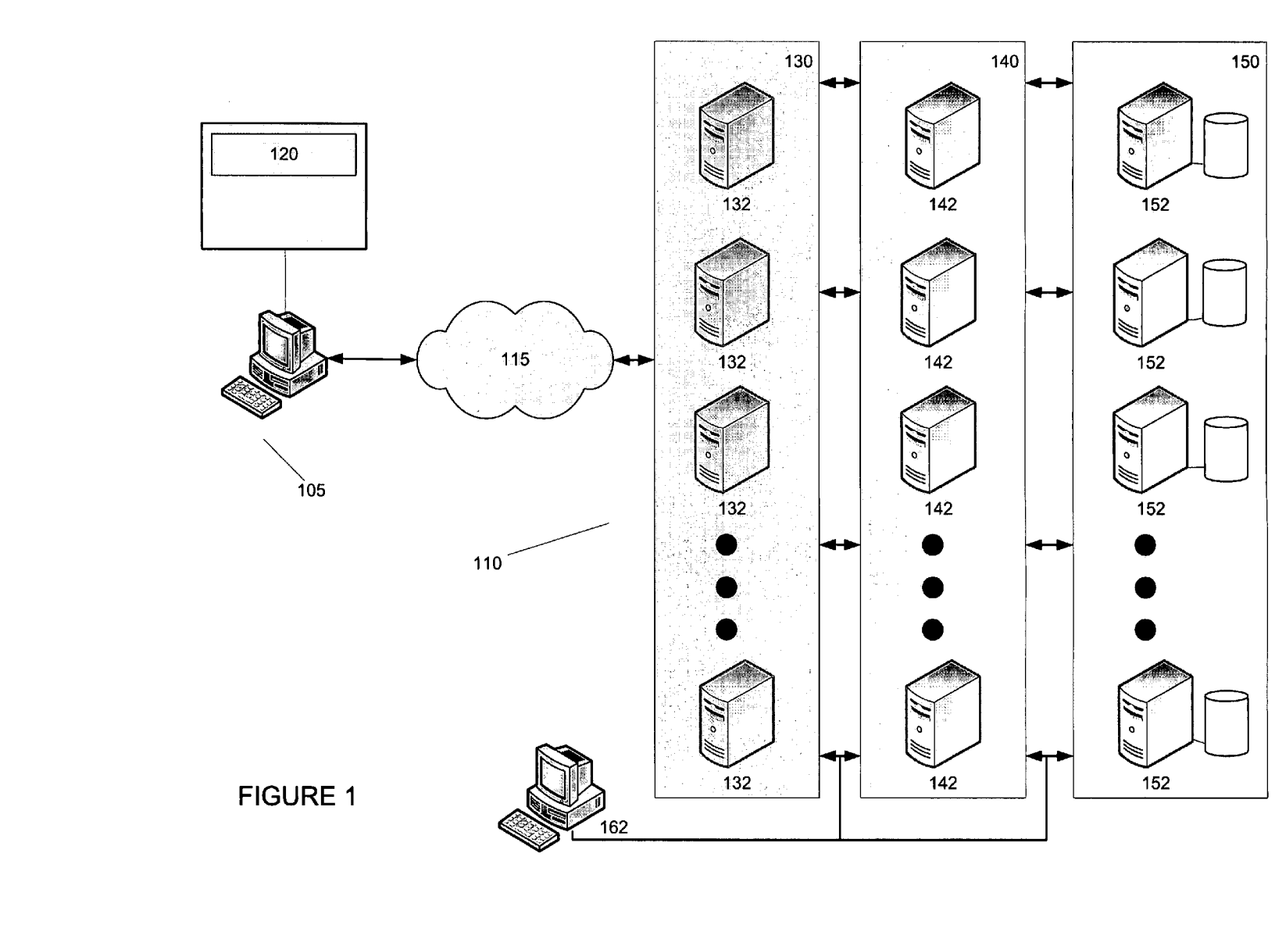
FIG. 1 depicts one embodiment of an exemplary information technology (IT) infrastructure.

Thus, to provide content in response to requests made by web browser program 120, IT infrastructure 110 may implement one or more applications configured to receive requests, processes requests, formulate a response to requests and return this response to web browser program 120. More specifically, IT infrastructure 110 may comprise a web server tier 130 comprised a set of web servers 132, an application server tier 140 comprising a set of application servers 142 and a database server tier 150 comprised of database servers 152. Each of the web servers 132, application servers 142 and database servers 152 may communicate with one another through a network (e.g., a LAN, WAN, wireless network, global communications network, or other network known in the art) and thus these servers 132, 142, 152 may reside in different physical locations, domains, etc. It will be apparent to those of skill in the art that the IT infrastructure 110 described is exemplary only, and that other IT infrastructures may include lesser or fewer tiers such as middleware layers, firewalls, load balancers, mainframes, etc., and that the embodiments of the invention described herein will apply equally well to these other IT infrastructures.

Thus, in many cases, when a user action at web browser program 120 generates a request to IT infrastructure 110 it is associated with a particular application whose components (e.g. any hardware or software which may be involved in the implementation of an application) may reside on one or more of web servers 132, application server 142 or database servers 142. When a request associated with a particular application arrives at a web server 132, a component of the application residing on web server 132 may generate a set of requests to application components residing on one or more other servers, such as application servers 142. Each of these application components may, in turn, generate a set of requests for application components residing on database servers 152. The application components on database servers 152 may respond to the requests from the application components on the application servers 142, which may in turn respond to the requests from the application components on the web servers 132. The application components on the web servers may take these responses and assemble a response to send to web browser program 120.

As can be seen then, a transaction may comprise multiple requests and responses between web servers 132, application servers 142 or database servers 152. To monitor transactions as they are processed by the various servers 132, 142, 152, a management system may be utilized, including management server 162 running a management application to track transactions or application traffic (e.g. communications between servers 132, 142, 152 associated with a user particular user request or particular applications) occurring with respect to IT infrastructure 110. This may allow an analysis or triage of IT infrastructure 110 to be performed on a more granular level, as the set of communications associated with processing transactions or the running of applications may be analyzed according to various metrics, including an analysis at the application component or device level.

In order to gather information on transactions occurring with respect to various applications, the underlying application infrastructure (e.g. the servers 132, 142, 152 of IT infrastructure 110 on which application components reside) may be instrumented, in one embodiment, by installing an agent on servers 132, 142, 152 running application components where the agent is operable to monitor the application component residing on the server 132, 142, 152, including incoming and outgoing traffic associated with the application.

As discussed previously, this may be a manually intensive task. IT infrastructure 110 and applications (e.g. application components) running in conjunction with IT infrastructure 110 may need to be monitored substantially constantly for changes or additions and these changes reflected in the deployment configuration of agents on servers 132, 142 or 152. These updates may require a great deal of manual intervention and furthermore may become exponentially more complex in a heterogeneous environment as different agents or configurations for these agents may be utilized in accordance with variations within IT infrastructure 110 (e.g. different types of operating systems, server applications, communication protocols, database applications, middleware, etc.) It is desirable, therefore, to reduce the effort involved in deploying these agents across the IT infrastructure 110 to monitor applications running in conjunction with the IT infrastructure 110.

To that end, attention is now directed to systems and methods for deploying agents for a management system across IT infrastructure in a more automated fashion. Broadly speaking, embodiments of the present invention allow agents to be substantially automatically deployed or configured in conjunction with previously unknown or newly added application components. More specifically, embodiments of the present invention may track traffic (e.g. inbound or outbound communication) associated with application components to identify unknown (i.e. currently unmonitored by an agent associated with the management system) application components. Agents may then be deployed to monitor these newly identified application components. In this manner, any changes to an IT infrastructure or application components may be accounted for by deploying agents associated with a management system substantially automatically without changes to either the application or the rest of the management system itself. While the embodiments of the systems and methods of the present invention may be particularly useful for deploying monitoring agents in conjunction with a management system in an IT infrastructure, other embodiments of the present invention may also be equally useful in deploying other types of software across other types of infrastructures.

In fact, embodiments of the present invention can be implemented to deploy software at any layer in a tiered architecture (e.g., at web servers, application servers, database servers or other servers or components) in conjunction with almost any type of protocol or system including HTTP, HTTPs, Macromedia Flex, streaming content requests, email system requests, Telnet requests, SMTP requests, POP requests, IMAP requests, MAPI requests, FTP requests, LDAP requests, WAP/MMS and Radius requests, TCIP/IP requests, UDP requests, COBRA requests, J2EE/EJB requests, requests according to the .NET framework, SOAP requests, ODBC requests, ADO requests, Oracle OCI requests, IBM CLI requests, IBM mainframe requests, (D)Com requests, SAP systems, PeopleSoft systems, Siebel systems, Oracle applications, Chordiant systems, E.piphany systems, Lawson systems, BEA Tuxedo applications and other systems and applications that can be deployed at various layers of a network.

Figure 2:
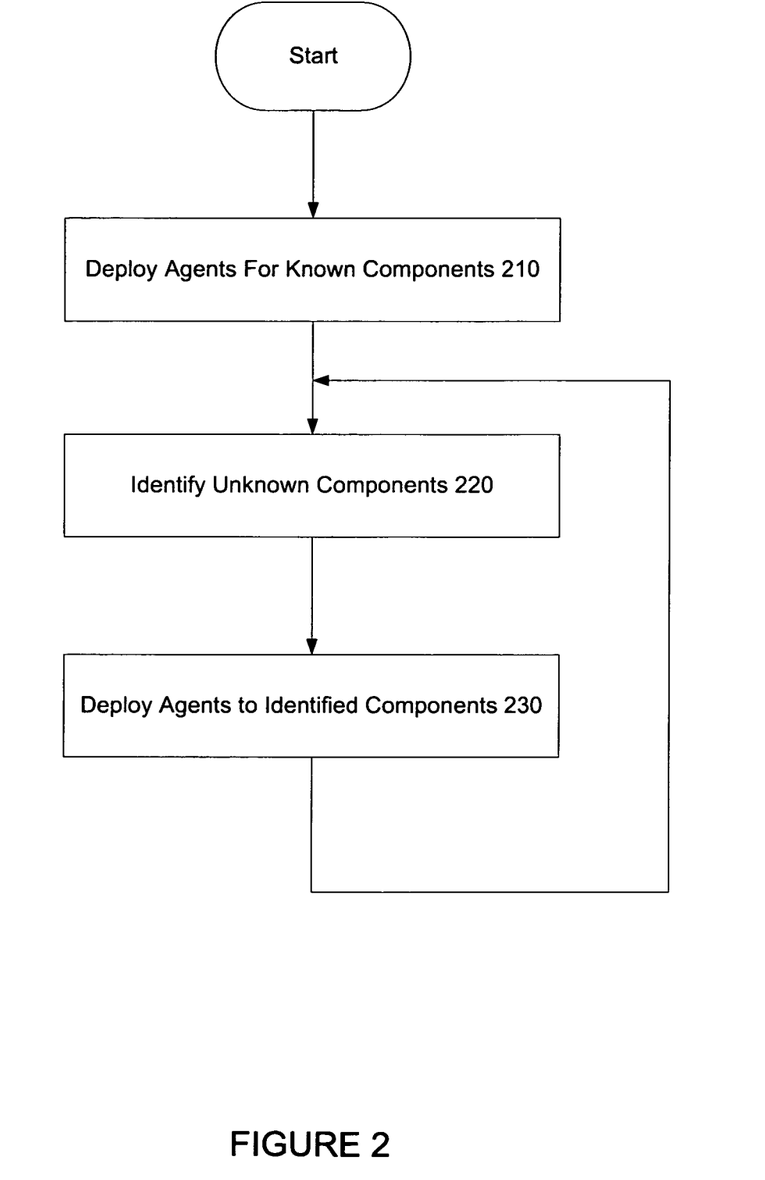
FIG. 2 depicts a flow diagram for one embodiment of a method for deploying agents for the monitoring of application components.

Turning to FIG. 2, a flowchart illustrating one embodiment of a method for deploying agents for a management system. Steps of FIG. 2 can be implemented as a set of computer instructions, for example agents for monitoring an application component or other components of a management system, stored on a computer readable medium and executable by a processor. Initially, at step 210, agents are deployed in conjunction with one or more known application components. Traffic flowing to and from the application component is monitored to identify unknown or unmonitored application components at step 220. Appropriate agents may then be automatically deployed to these identified application components at step 230. The newly deployed agents along with the previously deployed agents may continue monitoring application components to identify unknown or unmonitored application components. In this manner, agents may be substantially automatically deployed organically according to the expansion and contraction of an application or an IT infrastructure.

In one embodiment, a list of known application components may be assembled. These known application components may be gleaned, for example, during an initial installation of an application or may include application entry points (e.g. associated with a web server 132). These application entry points are usually well known as they are referenced by a user to access the application and are pointed to by user interface clients such as web browser 120. For example, the URL of a web application may point to the address of a web server 132 or an application component on the web server 132. Thus, a list of known application components may comprise one or more application components residing on a web server 132, application server 142, database server 152 or another component of IT infrastructure 110.

At step 210, then, agents are deployed to monitor or control these known application components. These agents may instrument one or more application component in order to allow tracking application flows (e.g. communications associated with an application). For example, an agent may be deployed on a web server 132, where the agent is a web server plug-in that captures application flow and correlates incoming and outgoing application traffic while an application server 142, such as a J2EE application server may be instrumented (e.g. have an agent deployed on it) by using Byte Code Instrumentation (BCI) in order to capture specific Java class calls that allow application flows to be tracked. The calls that may intercepted include common Java protocols such as Enterprise Java Bean (EJB) invocation, Java Messaging Services (JMS) calls, JDBC calls to a database, Remote Method Invocation (RMI), Java Connectivity Architecture (JCA), etc. .NET application servers may be instrumented by deploying an agent that monitors the Windows OS that runs the .NET components, etc.

It will be apparent to those of skill in the art that many different means and methodologies may be used to monitor or control a particular application component, and the particular agent to deploy in conjunction with a particular application component may depend on a whole host of variables such as the type of application or application component being monitored, the other software components being utilized in conjunction with the application component (e.g. server applications, protocols, operating systems, etc.), the type or architecture of the management system being utilized, etc. For example, some application components (such as Siebel, SAP, Peoplesoft, etc.) may be instrumented using internal Application Programming Interfaces (APIs) and Application Response Measurement (ARM) instrumentation to track application flow. It will also be apparent that the term "deploying" does not necessarily constitute installing an agent on a particular device and may also indicate that an agent previously residing on that device (or another device) or another software component may be instructed or adapted to monitor a particular application component.

Figure 3:
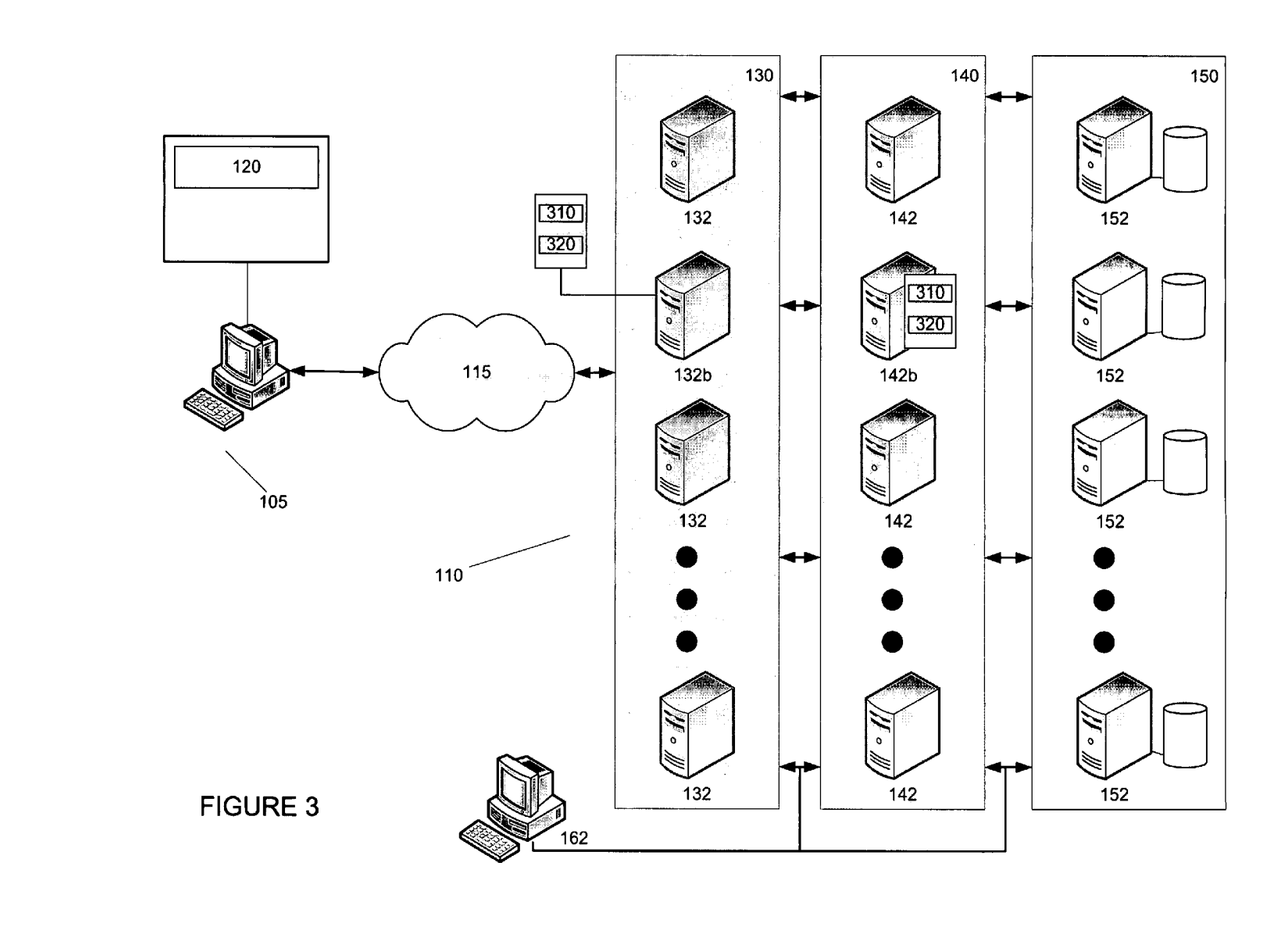
FIG. 3 depicts an example scenario for the application of one embodiment the present invention.

The example depicted in FIG. 3 may be helpful here in illustrating embodiments of the present invention. Suppose now that an application is initially implemented in conjunction with IT infrastructure 110 by installing application components 310 on web server 132b and application server 142b. Thus, at the point of the initial deployment of the application it may be known that application components 310 reside on web server 132b and application server 142b, and at step 210, agents 320 may be deployed on web server 132b and application server 142b to monitor application components 310. Although shown as a separate program, agents 320 can be implemented as any suitable set of code such as a module of another program (e.g. a web server program), a standalone program or according to any other suitable software architecture.

Once these agents are installed, at step 210, they may monitor traffic associated with the application being monitored to identify unknown application components. In one embodiment, this may be done by analyzing or processing the inbound traffic or outbound traffic associated with the application component being monitored. Once an unknown application component is identified, the application component and the server on which it resides may be added to a list of candidates for agent deployment assembled by the installed agent. This list may comprise an identifier for the application or application component (e.g. type of application component) and an identifier for the server 132, 142, 152 on which the unknown application component resides, such as an IP address. Periodically this list may be sent to management application on management server 162 or retrieved from the agent by the management application on management server 162, such that lists assembled by the set of installed agents may be collected at a central location.

For unknown application components, the communication to or from the unknown application component may be analyzed to determine or identify the type of the unknown application component. In one embodiment, this may be accomplished by analyzing the protocol the communication. These protocols may be HTTP, JDBC (for database access), RMI, JCA or almost any other protocol, as discussed above. Based on the protocol used and header information of the communication, the type of the originating or destination application component may be determined. For example, a JDBC call will have a target of a database while a RMI call will have a target of a J2EE application server (e.g. Websphere or Weblogic).

The association of incoming and outgoing traffic with the application and determination of unknown application components may be accomplished without any alteration to underlying application components. In one embodiment, a communication for an application component which is monitored by an agent is analyzed by the agent to determine if the communication has a unique correlator (e.g. embodiments may utilize an ARM 4.0 correlator as explained in more detail below). If the communication has this unique correlator, it has been received from another application component that is already being monitored by an agent and thus this application component is not a candidate for deployment (e.g. that application component is not unknown) otherwise the originating application component may be a candidate for deployment of an agent. If the received communication is not tagged with the unique correlator, the agent monitoring the application component may tag communications from the application component with the unique correlator. Embodiments of systems and methods which may also be helpful in analyzing communications associated with a transaction are disclosed in U.S. patent application Ser. No. 11/515,655 entitled "System and Method for Classifying Requests", by Razi Sharir, Alon Tam and Ronen Mintz, filed on Sep. 5, 2006.

To determine if the destination of an outgoing communication from the application component is an unknown application component, a repository comprising known application components may be kept by an agent (and which may be updated by management application on management server 162 or by some other methodology). This repository may include such information as IP addresses of known application components, software types for these application components, and ports associated with the application component. The destination (e.g. IP address, port destination, etc.) of the communication is compared against the list of locations of known application components and if the destination is not in the list of locations the location and application component type may be added to the list of candidates for deployment as described above. Thus, a combination of software type along with the IP address and port of the transaction may be used to identify if a destination for a communication is currently monitored by an agent.

In one embodiment, ARM 4.0 correlators may be used to tag application traffic when it is identified by agents such that application traffic may be correlated and analyzed as described above (e.g. incoming and outgoing traffic may be associated with an application, unknown application components determined, etc.).

The agent monitoring the known application component may also determine if the application component has not been utilized for a certain time period in certain embodiments (e.g. no application traffic to or from the component for the period of time). The agent may then be added to a list for uninstallation, which also may be collected at the management application. In one particular embodiment, one list may comprise both candidates for deployment and uninstallation, with a particular identifier differentiating the two.

Figure 4:
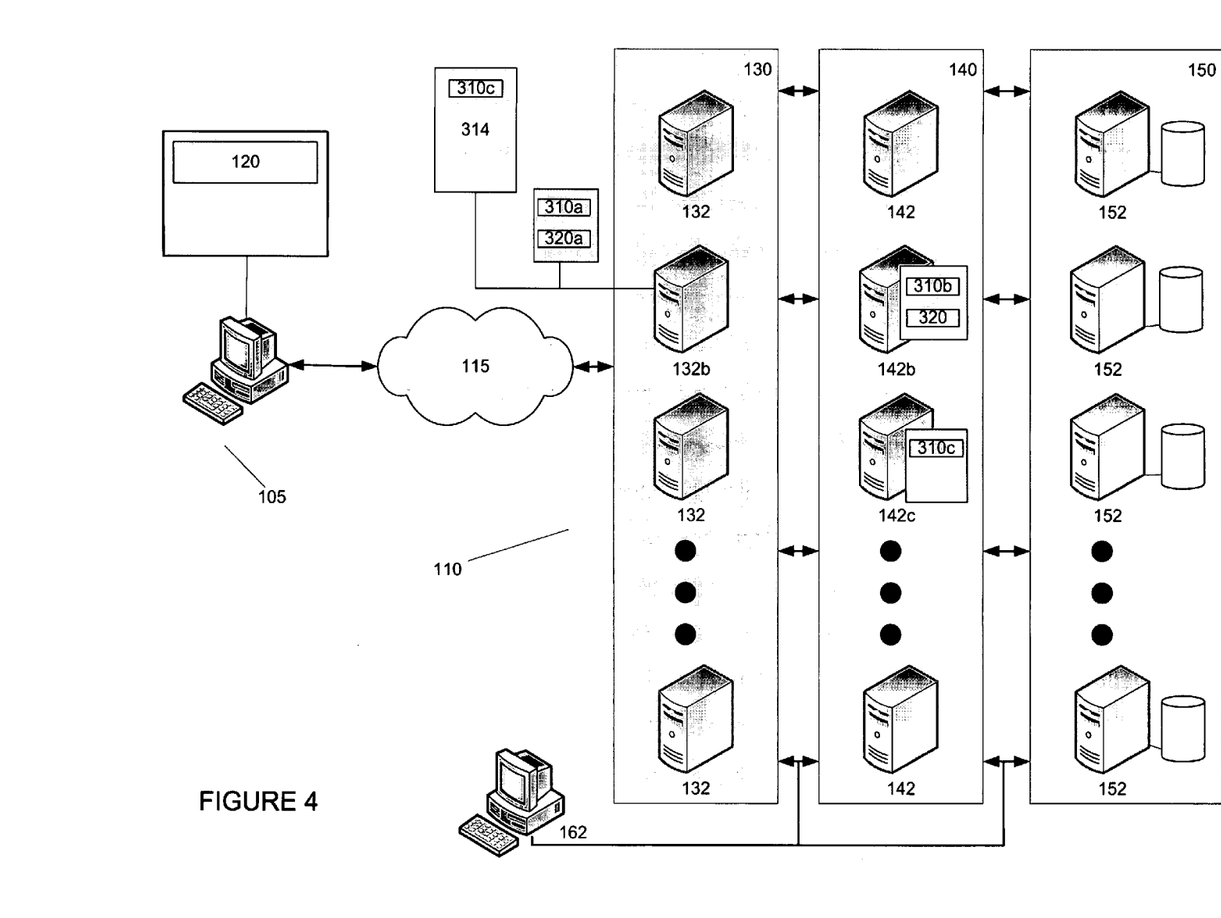
FIG. 4 depicts an example scenario for the application of one embodiment the present invention.

Continuing with the above example with reference to FIG. 4, suppose now that an application component 310c is installed on application server 142c such that application traffic now flows between application component 310a on web server 132b and both of application components 310b and 310c installed on application servers 142b and 142c, respectively. Agent 320a on web server 132b may monitor outgoing traffic bound for application components 310b and 310c and analyze this outgoing traffic, as discussed above, to determine that application component 310c is an unknown component. Agent 320a may then assemble list 314 of unknown components with an identifier for application component 310c, application server 142c or both. List 314 may then be sent to, or retrieved by, manager application on management server 162.

After the unknown components are identified, agents may be deployed in conjunction with these unknown components at step 230. In one embodiment, the lists collected from agents monitoring known application components may be processed such that the proper agent for the identified unknown application components and associated devices may be identified. The appropriate agent to utilize with an unknown application component may be determined according to the application protocol that was used in an outgoing communication to that unknown application component, e.g. database agent for outbound JDBC call, an agent operable for J2EE for EJB or RMI calls, etc., or other means as described above.

An identifier for this protocol may have been included in the list of unknown application components assembled by an agent monitoring a known component, or may be determined by management application through processing of the list. These agents may then be deployed to monitor these previously unknown application components (note that these application components are now known application components). Likewise, in one embodiment, agents designated for uninstallation may also be uninstalled. As installation (and uninstallation) activities are performed from a central location manual intervention in the process is reduced.

In one embodiment, a user (e.g. IT administrator) may review the identified unknown application components to determine which identified unknown application components should have agents deployed to monitor them. Each of the unknown application component selected by the user may then be instrumented with an appropriate agent. Similarly, the candidates for uninstallation may also be reviewed by a user before they are uninstalled.

Figure 5:
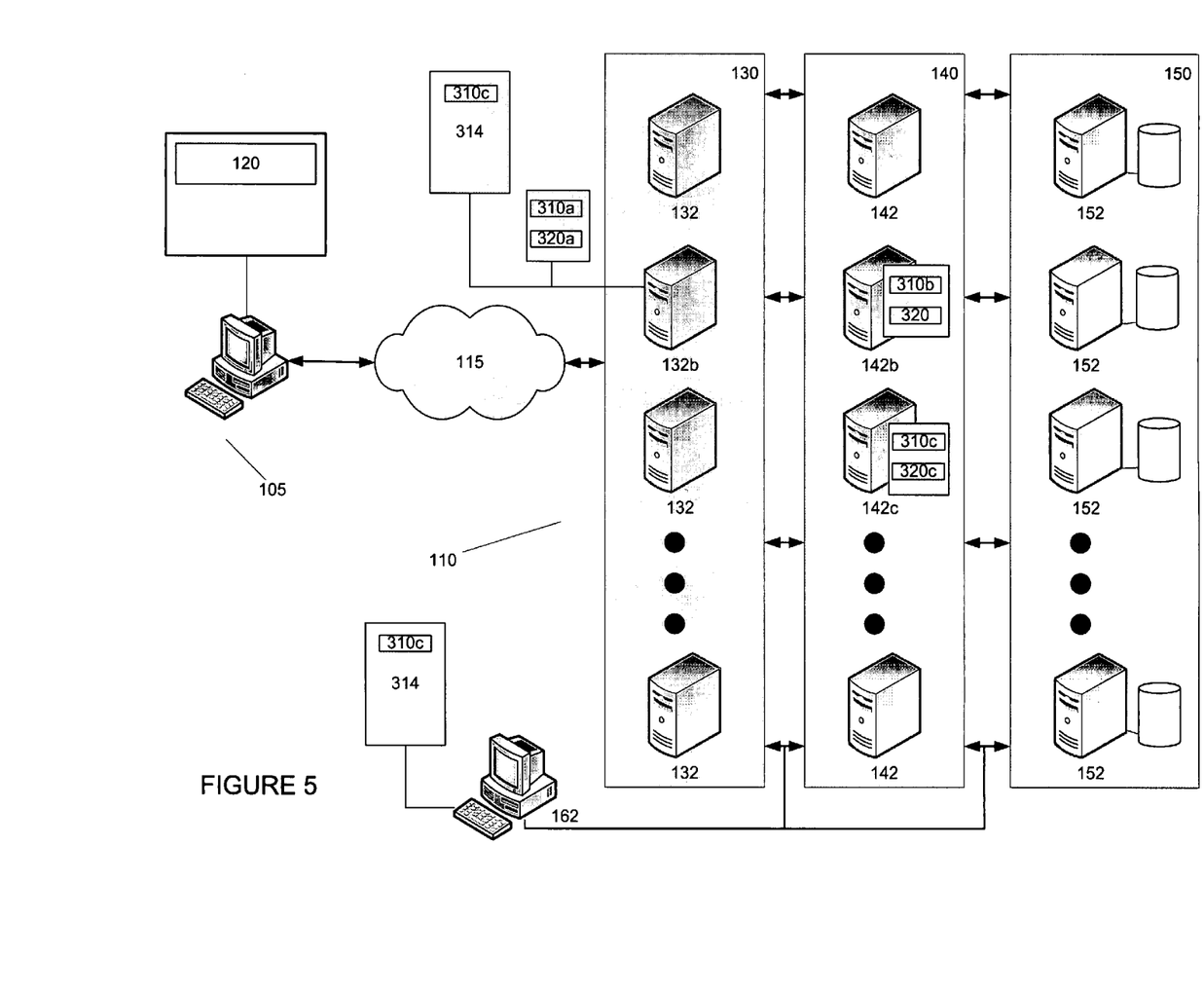
FIG. 5 depicts an example scenario for the application of one embodiment the present invention.

The deployment of agents according to step 230 is illustrated with respect to the example above in FIG. 5. Here, list 314 assembled by agent 310a on web server 132b is collected by (e.g. retrieved or received) management application on management server 162. List 314 may comprise an identifier for application component 310c on application server 142c, and an identifier for application server 142c. The management application may then analyze these identifiers to determine an appropriate agent to deploy on application server 142c to monitor application component 310c. This agent 320c may then be deployed on application server 142c to monitor application component 310c. Agents 320 may now continue to monitor application components 310 to identify unknown application components which subsequently manifest themselves such that they too may be automatically instrumented.

Figure 6:
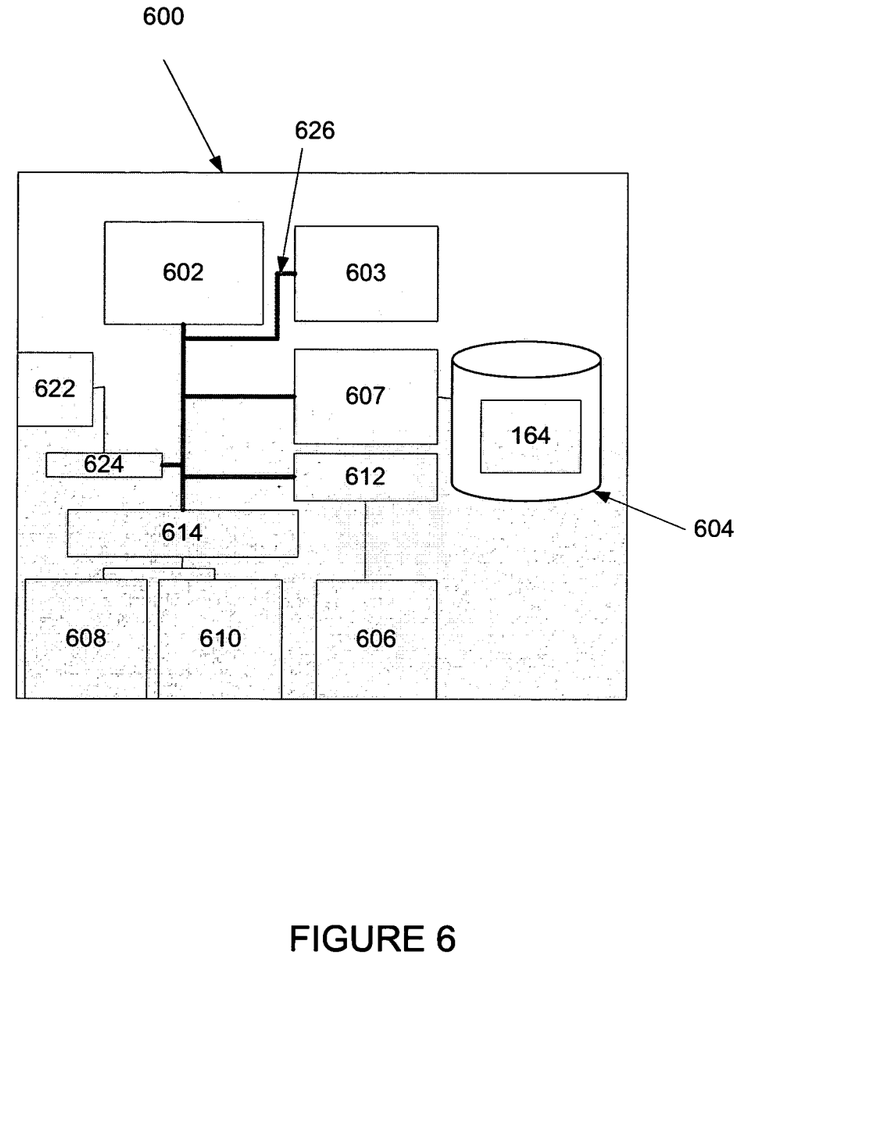
FIG. 6 depicts a block diagram of one embodiment of a computer device.

While embodiments of the present invention may be suitable for use with almost any type of computing device it may be helpful to illustrate one example herein. FIG. 6 provides a diagrammatic representation of one embodiment of a computing device 600 that can provide at least a portion of a management system, a server, etc. Computing device 600 can include a processor 602, such as an Intel Pentium 4 based processor (Intel and Pentium are trademarks of Intel Corporation of Santa Clara, Calif.), a primary memory 603 (e.g., RAM, ROM, Flash Memory, EEPROM or other computer readable medium known in the art) and a secondary memory 604 (e.g., a hard drive, disk drive, optical drive or other computer readable medium known in the art). A memory controller 607 can control access to secondary memory 604. Computing device 600 can include I/O interfaces, such as video interface 606 and universal serial bus ("USB") interfaces 608 and 610 to connect to input and output devices. A video controller 612 can control interactions over the video interface 606 and a USB controller 614 can control interactions via USB interfaces 608 and 610. Computing device 600 can include a variety of input devices such as a keyboard and a mouse and output devices such as display devices. Computing device 600 can further include a network interface 622 (e.g., an Ethernet port or other network interface) and a network controller 624 to control the flow of data over network interface 622. Various components of computing device 600 can be connected by a bus 626.

Secondary memory 604 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 604 can store portions of a management system, an agent, a server application, etc. During execution by processor 602, portions of these programs can be stored in secondary memory 604 and/or primary memory 603.

Computing device 600 of FIG. 6 is provided by way of example only and it should be understood that embodiments of the present invention can implemented as a set of computer instructions stored on a computer readable medium in a variety of computing devices including, but not limited to, servers, desktop computers, laptops, mobile devices, workstations and other computing devices.

Management applications, agents, applications, etc. can be executable to receive and store data over a network and can include instructions that are stored at a number of different locations and are executed in a distributed manner. For example, as depicted in FIG. 6, a management application 164 resides in secondary memory 604. While shown as a stand alone program in FIG. 6, it should be noted that management application 164 can be a module of a larger program, can comprise separate programs operable to communicate data to each other via or can be implemented according to any suitable programming scheme.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims. For example, a management application may not run on a dedicated management server, and may execute on any of the devices in an IT infrastructure, including those running application components. Additionally, it may be the case that it is not desirable to deploy agents from a central location. In cases such as these, a deployed agent may be operable to deploy an agent on an unknown component directly, without the involvement of a central management server.

What is claimed is:

1. A method executed on processor in a management server in a network for deploying monitoring agents in the network, comprising:

deploying a first agent to monitor a first application component of an application, wherein the first agent is operable to monitor a communication associated with the first application component, wherein the communication is outbound from the first application component to an unknown second application component of the application;

determining if the communication is associated with the unknown second application component of the application where the unknown second application component is not monitored, including analyzing the communication to determine if the communication comprises a correlator;

determining an identifier for a type of the unknown second application component and a location for the unknown second application component based on the communication, wherein the type of the unknown second application component is determined by analyzing a protocol of the communication;

if the communication is associated with the unknown second application component, deploying a second agent over the network to monitor the unknown second application component, wherein the second agent is selected based on the identifier and the location of the unknown second application component; and assembling a deployment candidate list comprising the identifier for the type of the unknown second application component and the location of the unknown second application component.

2. The method of claim 1, wherein determining if the communication is associated with the unknown second application component comprises determining a location of the unknown second application component and comparing the location to a list of known application components.

3. The method of claim 1, further comprising receiving the deployment candidate list at a management application, wherein the second agent is deployed to monitor the unknown second application component from the management application.

4. The method of claim 3, wherein the second agent deployed is determined based on the type of the unknown second application component.

5. The method of claim 4, wherein the deployment candidate list is reviewed by a user before the second agent is deployed.

6. The method of claim 1, further comprising determining if the first application component has not been utilized for a period of time and uninstalling the first agent if the first application component has not been utilized for the period of time.

7. A non-transitory computer readable medium, comprising instructions translatable for deploying monitoring agents from a management server in a network:
  deploying a first agent to monitor a first application component of an application, wherein the first agent is operable to monitor a communication associated with the first application component, wherein the communication is outbound from the first application component to an unknown second application component of the application;
  determining if the communication is associated with the unknown second application component of the application where the unknown second application component is not monitored, including analyzing the communication to determine if the communication comprises a correlator;
  determining an identifier for a type of the unknown second application component and a location for the unknown second application component based on the communication, wherein the type of the unknown second application component is determined by analyzing a protocol of the communication; and
  if the communication is associated with the unknown second application component, deploying a second agent over the network to monitor the unknown second application component, wherein the second agent is selected based on the identifier and the location of the unknown second application component; and
  assembling a deployment candidate list comprising the identifier for the type of the second application component and the location of the second application component.

8. The non-transitory computer readable medium of claim 7, wherein determining if the communication is associated with the second application component comprises determining a location of the second application component and comparing the location to a list of known application components.

9. The non-transitory computer readable medium of claim 7, wherein the instructions are further translatable for receiving the deployment candidate list at a management application, wherein the second agent is deployed to monitor the second application component from the management application.

10. The non-transitory computer readable medium of claim 9, wherein the second agent deployed is determined based on the type of the second application component.

11. The non-transitory computer readable medium of claim 10, wherein the deployment candidate list is reviewed by a user before the second agent is deployed.

12. The non-transitory computer readable medium of claim 7, wherein the instructions are further translatable for determining if the first application component has not been utilized for a period of time and uninstalling the first agent if the first application component has not been utilized for the period of time.

13. A management system, comprising:
  a set of servers, wherein each server has a processor;
  a management server coupled to the set of servers through a network, wherein the management server has a processor;
  a first set of agents, each of the agents on one of the set of servers and operable to assemble a list of unknown application components by monitoring a communication to an application component and
  determine if the communication is associated with an unknown application component by analyzing the communication to determine if the communication comprises a correlator,
  wherein the list of unknown application components includes a location and a type of each unknown application component, where the location and type were determined based on the communication, wherein the type of the unknown application component is determined by analyzing a protocol of the communication; and
  a management application on the management server operable to receive the lists of unknown application components from the set of agents and deploy a second set of agents to a set of the unknown application components over the network based on the location and the type of the set of the unknown application components, each of the second set of agents operable to monitor a corresponding unknown application component.

14. The management system of claim 13, wherein each of the first set of agents maintains a list of known application components and each of the first set of agents is operable to compare a destination of the communication with the list of known application components to determine if the communication is associated with an unknown application component.

15. The management system of claim 13, wherein the manager application is operable to determine the type of each of the set of second agents based on the type of the second application component.

16. The management system of claim 13, wherein the unknown application components in the lists of unknown application components are reviewed by a user such that the user can select the set of unknown application components on which the second set of agents are deployed.

* * * * *